US008914434B2

United States Patent
Carrier et al.

(10) Patent No.: US 8,914,434 B2
(45) Date of Patent: Dec. 16, 2014

(54) METHOD AND APPARATUS FOR SYNDICATING INTERACTIONS BETWEEN A CLIENT AND A WEB SERVICE

(75) Inventors: Scott R. Carrier, Apex, NC (US); John R. Hind, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 855 days.

(21) Appl. No.: 11/733,829

(22) Filed: Apr. 11, 2007

(65) Prior Publication Data

US 2008/0256213 A1    Oct. 16, 2008

(51) Int. Cl.
G06F 15/16    (2006.01)
G06F 17/28    (2006.01)
G06Q 30/02    (2012.01)

(52) U.S. Cl.
CPC ....................................... *G06Q 30/02* (2013.01)
USPC ............................ 709/203; 709/217; 715/221

(58) Field of Classification Search
USPC .................................. 709/203, 217; 715/221
See application file for complete search history.

(56) References Cited

U.S. PATENT DOCUMENTS

| 2005/0165810 | A1* | 7/2005 | Yokoyama | 707/100 |
| 2005/0273503 | A1* | 12/2005 | Carr et al. | 709/219 |
| 2006/0155698 | A1* | 7/2006 | Vayssiere | 707/6 |
| 2006/0161646 | A1* | 7/2006 | Chene et al. | 709/223 |
| 2007/0038683 | A1* | 2/2007 | Dixon et al. | 707/202 |
| 2007/0209011 | A1* | 9/2007 | Padmanabhuni et al. | 715/762 |

* cited by examiner

*Primary Examiner* — Ranodhi Serrao
(74) *Attorney, Agent, or Firm* — Steven M. Greenberg, Esq.; CRGO Law

(57) ABSTRACT

The Syndicated Web Services Client (SWSC) uses RSS/ATOM feeds, to facilitate asynchronous interactions between a computerized client and a web service, without requiring a duplicate copy of the web service application on the client. The web service packages an XForm containing interactive fields used by the web service in a RSS/ATOM feed item. The web service sends the RSS/ATOM feed item to the client, which is a subscriber to the web service's RSS/ATOM feed and is in network communication with a server hosting the web service. The client displays the form for use by a user. Responsive to the user of the client manipulating interactive fields in the form, the client packages the manipulated form in a return RSS/ATOM feed item. The client sends the return RSS/ATOM feed item to the server which is a subscriber to the client's return RSS/ATOM feed.

6 Claims, 6 Drawing Sheets

FIG. 7

METHOD AND APPARATUS FOR SYNDICATING INTERACTIONS BETWEEN A CLIENT AND A WEB SERVICE

FIELD OF THE INVENTION

The present invention relates generally to electronic data processing and specifically to using RSS/ATOM feeds to syndicate interactions between a remote client and a web service.

BACKGROUND OF THE INVENTION

Really Simple Syndication ("RSS") is a family of XML formats which are used to publish frequently updated information on internet sites, often referred to as a feed. ATOM syndication format is a standardized XML format for publishing feeds. Both RSS and ATOM use metadata containing specific information about the content of the feed.

Feeds are used to update subscribing clients with current information organized as a list of items which are tagged with unique identifiers such that the client can easily identify the new information in each successive feed. A typical example is a web page operated by a news organization. New articles are added to the web page, hosted by a server, throughout the day. User clients can return to the web page displaying the articles and search for new ones, or user clients can subscribe to the feed which provides the user client with a listing of the current articles tagged in a way that makes it easy to identify those that have been added. The feed may actually contain the whole article, a description, the authors name, a date, and/or other metadata along with a link to the article body. The subscription can be set up to broadcast, or push the feed to the user client, or the subscription can be set up for the user client to pull the feed from the news organization's server.

A subscriber views the feed in a reader which may be a simple browser web page that shows the feed in a user friendly fashion. The feed is usually displayed in the reader with several frames allowing the user to scroll through the list of contained items and view the item details. Typically, feed readers are modules that run in conjunction with an Internet browser since the item detail often contains Hypertext Markup Language (HTML) formatted information. HTML is the predominant language used for creating web pages.

Feeds can contain metadata describing the content of the feed. This metadata can be used to customize feed subscriptions. In the case of the news feed above, the metadata can include keywords related to the article. Subscribers can specify what type of news they want included in their subscription. For example, a subscriber might only want news articles about NASCAR and IBM. The subscriber will only be notified of articles containing the desired keywords.

Feeds work for both synchronous and asynchronous interactions. A synchronous interaction occurs between a client and a server in real-time. An asynchronous interaction occurs between client and server at different times such as when the client goes offline, then re-syncs the next time the client connects.

Many business operations are now conducted using synchronous interactions, such as exchange-based e-mail, and web-based applications. With synchronous interactions, business operations can be conducted at a centralized server. A bulk of the data can be stored on the centralized server. Centralized computing creates efficiencies and gives the business better control over access to data. One efficiency gained by centralized computing with synchronous interaction is the ability to deploy inexpensive thin client user interfaces.

A thin client is a device using a client-server model where the client acts primarily as a local user interface that displays the results of operations that are performed on a remote server. One example of a thin client is using a web-based application with a web browser on the client. Another example is using a dumb terminal connected to a corporate network. A constant, uninterrupted connection to the Internet or a local network is required for synchronous operations with a thin client.

Asynchronous operations are usually associated with a rich client capable of performing operations independently from the server. A rich client (also called a fat or thick client) is a device using a client-server model where the client is capable of performing a bulk of processing operations locally such as a PC or laptop. The rich client has duplicate copies of files and applications available on the server. Rich client operations generally occur on the local client rather than at the server, although the server might get updated at a later time. Asynchronous operations are useful for clients that do not have constant access to the Internet or a corporate network.

In recent years, businesses have started using a Service-Oriented Architecture (SOA). Rather than a traditional architecture using tightly coupled application components where each component has knowledge of the details of those with which it interacts, SOA applications are built on independent services that can be accessed without knowledge of their underlying implementation. SOA is implemented using a wide range of technologies, including: Representational State Transfer (REST), Remote Procedure Call (RPC), Distributed Component Object Model (DCOM), Common Object Request Broker Architecture (CORBA), and Web Services. These different services inter-operate based on a formal definition such as Web Services Description Language (WSDL) that is independent of the underlying platform. Each web service programming language specifies requests and responses in a neutral fashion to ensure inter-operability. One such neutral request and response protocol is Simple Object Access Protocol (SOAP) for exchanging XML-based messages.

Most web service applications rely on some kind of user interaction. In the traditional synchronous web based case, the user interaction is done using HTML forms presented by the web server which would return data entered or modified by the user in an HTML message to the server. One problem in using HTML forms is maintaining a rich user experience, such as instantly validating user input, or modifying the choices presented as form information is entered. Many schemes, such as client side scripting and browser plug-in extensions have been tried to provide this rich user experience. A recent technology called "XForms" addresses the rich user experience problem with an interactive form that uses a Model-View-Controller (MCV) approach. The "model" describes the form data, constraints upon that data, and submissions. The "view" describes what controls appear in the form, how they are grouped together, and what data they are bound to. The "controller" responds to events performed by the user, such as displaying a new view when a user enters data into the form. While no widely used web browsers currently support XForms natively, XForm support is available via browser extensions and will be adopted in future offerings.

As users move away from the traditional office setting into a mobile way of doing business with SOA, it becomes advantageous to allow users to asynchronously interact with web service driven business processes. Asynchronous interactions allow the user to continue conducting business, even when the user cannot access the remote server via the Internet or local network. At the same time the mobile user should still have the same efficiencies provided by a thin-client model where the bulk of the processing still occurs on the corporate server, not the local client. A need exists for a client interface that allows asynchronous, disconnected operation without requiring a copy of the web service application on the client.

SUMMARY OF THE INVENTION

The Syndicated Web Services Client (SWSC) uses RSS/ATOM feeds, to facilitate asynchronous interactions between a computerized client and a web service, without requiring a duplicate copy of the web service application on the computerized client. The web service packages a form, such as an XForm containing interactive fields used by the web service, in a RSS/ATOM feed item. The web service sends the RSS/ATOM feed item to a computerized client, wherein the computerized client is a subscriber to the web service's RSS/ATOM feed and the computerized client is in network communication with a server hosting the web service. The computerized client displays the form for use by a user. Responsive to the user of the computerized client manipulating interactive fields in the form, the computerized client packages the manipulated form in a return RSS/ATOM feed item. The computerized client sends the return RSS/ATOM feed item to the server hosting the web service, wherein the server is a subscriber to the computerized client's return RSS/ATOM feed.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

FIG. 7 is a exemplary XForm and client user interface using the SWSC.

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory. The term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the Syndicated Web Services Client or "SWSC."

Figure 1:
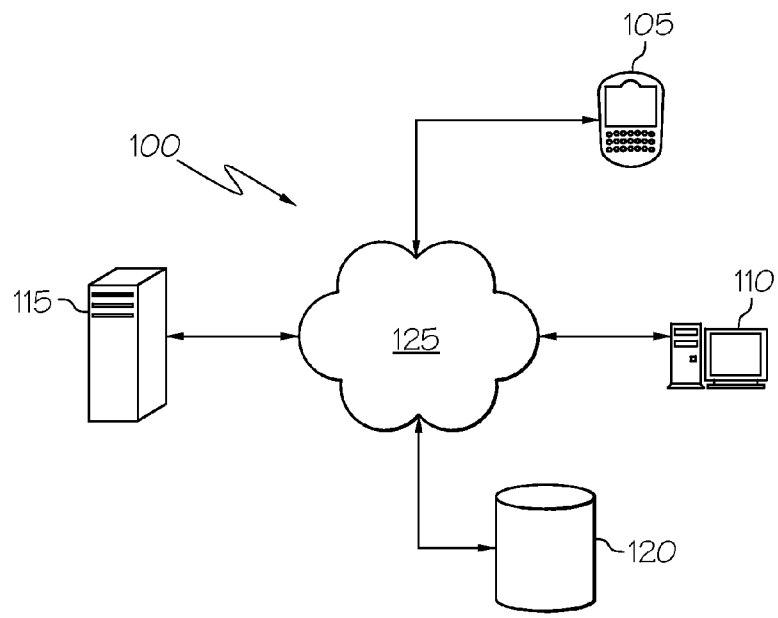
FIG. 1 is an exemplary network.

Additionally, the SWSC is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including mobile computing device 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

Figure 2:
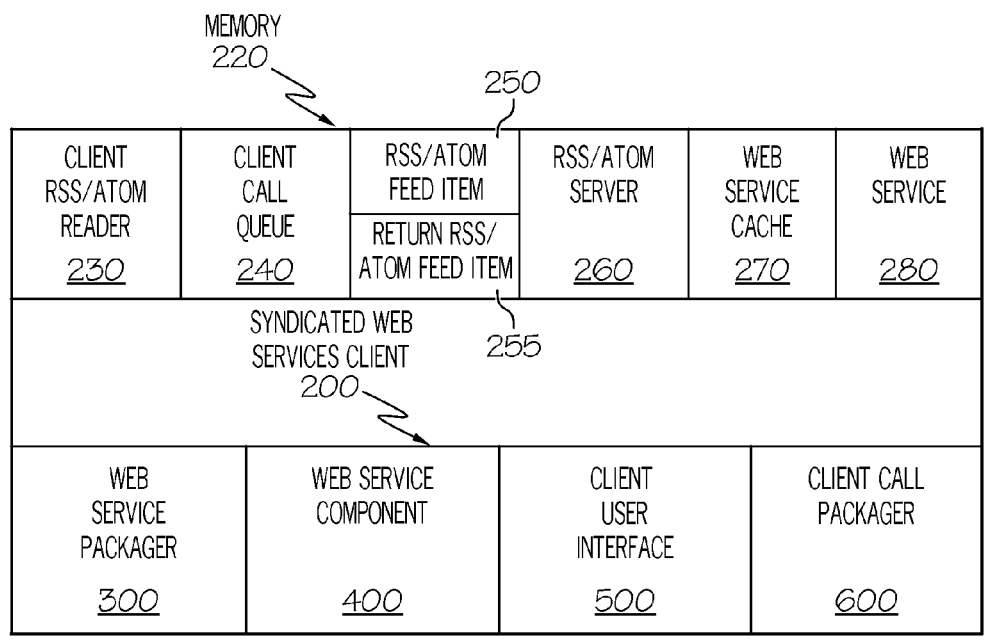
FIG. 2 illustrates files and applications in a memory.

SWSC 200 typically is stored in a memory, represented schematically as memory 220 in FIG. 2. The term "memory," as used herein, includes without limitation any volatile or persistent medium, such as an electrical circuit, magnetic disk, or optical disk, in which a computer can store data or software for any duration. A single memory may encompass and be distributed across a plurality of media. Further, SWSC 200 may reside in more than one memory distributed across different computers, servers, logical partitions, or other hardware devices. The elements depicted in memory 220 may be located in or distributed across separate memories in any combination, and SWSC 200 may be adapted to identify, locate and access any of the elements and coordinate actions, if any, by the distributed elements. Thus, FIG. 2 is included merely as a descriptive expedient and does not necessarily reflect any particular physical embodiment of memory 220. As depicted in FIG. 2, though, memory 220 may include additional data and programs. Of particular import to SWSC 200, memory 220 may include client RSS/ATOM reader 230, client call queue 240, RSS/ATOM feed item 250, return RSS/ATOM feed item 255, RSS/ATOM server 260, web service cache 270, and web service 280 with which SWSC 200 interacts. SWSC 200 has four components: web service packager 300, web service component 400, client user interface 500, and client call packager 600.

In a preferred embodiment, client RSS/ATOM reader 230, client call queue 240, client user interface 500, and client call packager 600 reside on a client computer, such as a laptop or mobile computing device capable of accessing a corporate network or the Internet. Client RSS/ATOM reader 230 is a conventional, commercially available RSS/ATOM reader, which may be a standalone application or integrated with an Internet browser. Client user interface 300 may be integrated with or may be a plug-in to client RSS/ATOM reader 230.

RSS/ATOM server 260 is a conventional, commercially available RSS/ATOM server. RSS/ATOM server 260, web service cache 270, web service 280, web service packager 300 and web service component 400 are preferably located on one or more servers connected to a corporate network or the Internet. Web service packager 300 may be integrated with or a plug-in to web service 280. Web service component 400 may be integrated with or a plug-in to RSS/ATOM server 260.

RSS/ATOM feed item 250 is a file containing data that is capable of being transmitted across a corporate network or the Internet. The RSS/ATOM feed item contains User interface (UI) metadata, allowing a computerized client to display a graphical user interface that would normally be accessed and manipulated though a direct Internet or network connection with a server. The user can manipulate data in an item using an enhanced RSS reader or a custom user interface. A preferred way to package data in RSS/ATOM feed item 250 is with a SOAP Envelope. SOAP stands for "Simple Object Access Protocol" which is a protocol for exchanging XML-based messages over computer network using Hypertext Transfer Protocol (HTTP). As with an ATOM feed item, a SOAP envelope uses metadata containing information about the content SOAP message. One advantage to using SOAP envelopes with RSS/ATOM feed item 250 is the ability to transmit and create a local copy of an XForm, which is a standardized XML format used for Internet based forms used by web services, such as web service 280. XForms may contain a myriad of data entering options, such as text fields, radio buttons, check boxes, and drop-down menus. The data entries in an XForm generate commands or "calls" directed to web service 280. Return RSS/ATOM feed item 255 is the user manipulated XForm on a client computer containing calls to be returned to web service 280 for processing For simplicity, the invention is described below using a single interaction, with a single web service sending a single RSS/ATOM feed item to a single user, the user manipulating a single XForm, and the user client returning a single return RSS/ATOM feed item. One skilled in the art would realize that the benefits of the present invention are best realized when many web service interactions with multiple users are syndicated at the same time. Although it is advantageous to an RSS/ATOM feed to facilitate asynchronous processing on the web service in a fashion similar to the way a message queuing (MQ) system operates, when the client already is connected to the internet, the RSS/ATOM feed can be immediately processed resulting in a synchronous operation. Other feeds using different standards than RSS or ATOM may also be used. Similarly, other web service forms using a Model-View-Controller approach besides XForms may be used.

Figure 3:
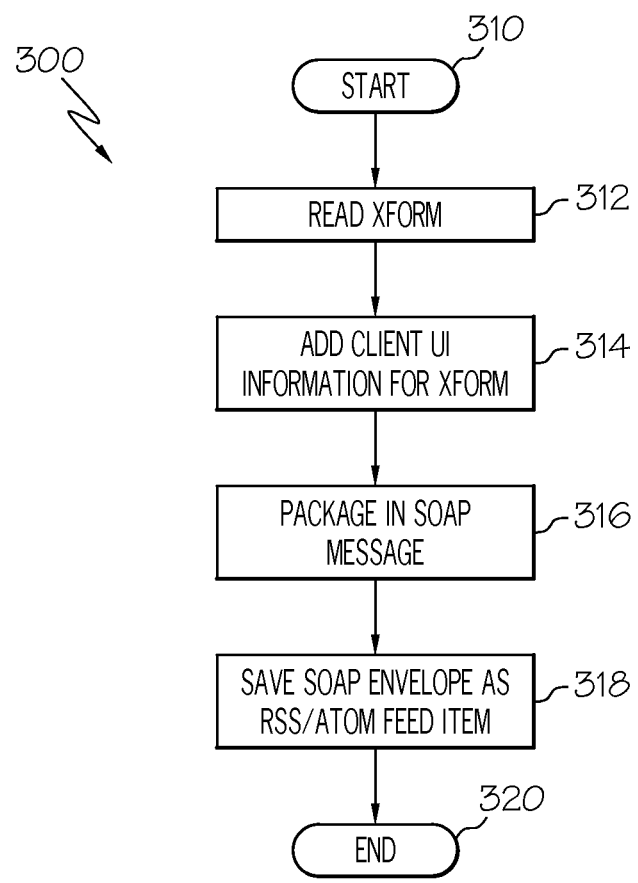
FIG. 3 is a flowchart of a web service packager.

Referring to FIG. 3, web service packager 300 starts when a request is initiated by web service 280 (310). Web service packager 300 reads the XForm generated by web service 280 (312) and adds any necessary user interface information for displaying the XForm (314). Web service packager 300 packages the XForm, user interface information and anything else required by web service 280 in a SOAP message (316) and saves RSS/ATOM feed item 250 to web service cache 270 (318), then stops (320).

Figure 4:
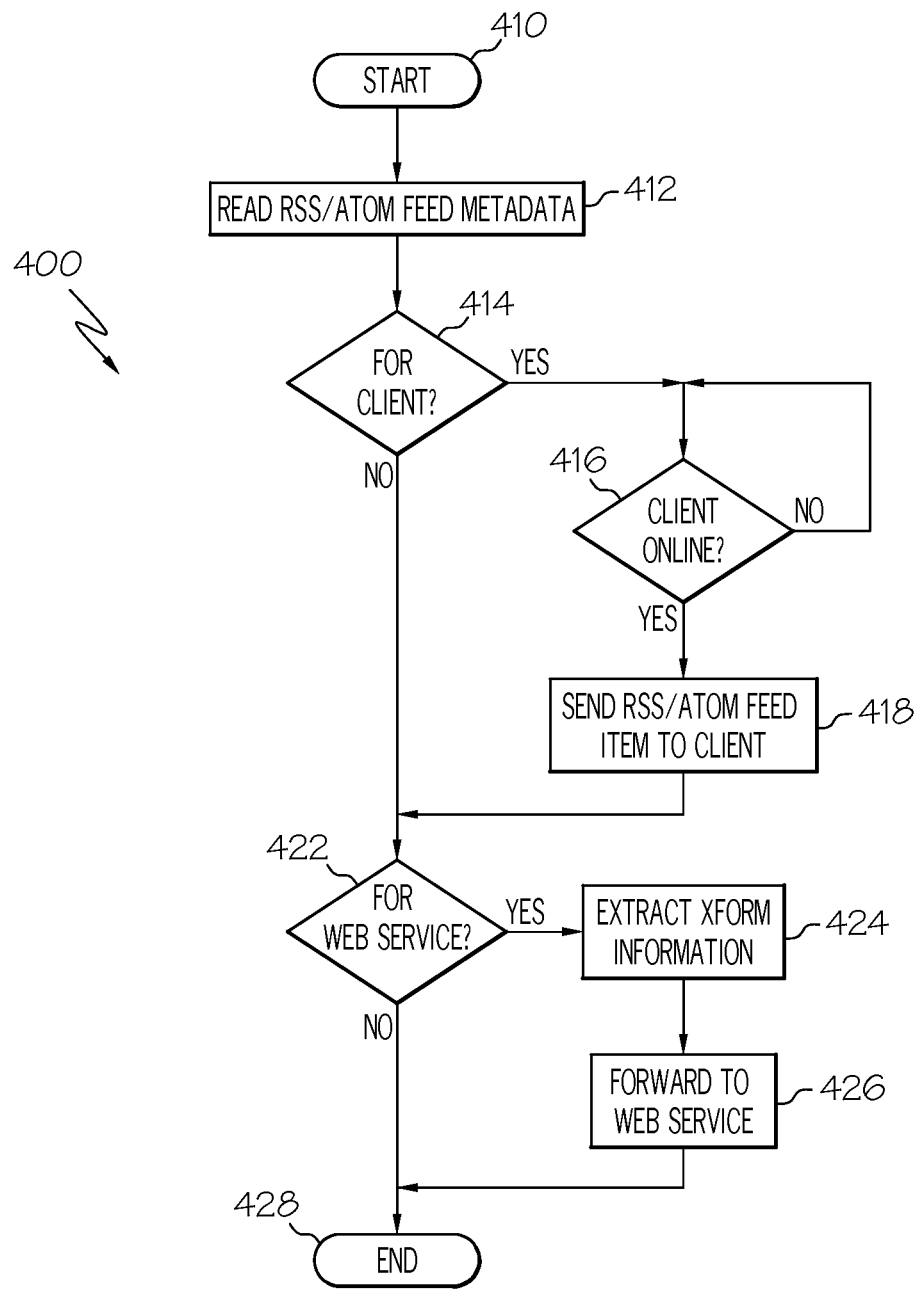
FIG. 4 is a flowchart of a web service component.

Referring to FIG. 4, web service component 400 starts whenever it receives a feed, such as RSS/ATOM feed item 250 save to web service cache 270 or return RSS/ATOM feed item 255 (410). Web service component reads the metadata from the feed (412). If the feed, such as RSS/ATOM feed item 250, is for a subscribing client (414), web service component 400 determines if the subscribing client is online or has requested the feed (416). Once the subscribing client is online or has requested the feed, the feed is sent to or retrieved by the subscribing client (418). If the feed, such as return RSS/ATOM feed item 255, is for a web service, such as web service 280 (422), web service component 400 extracts the XForm from the SOAP message (424) and forwards the XForm to web service 280 (426). After directing the feed based on the recipient, web service component 400 stops (428).

Figure 5:
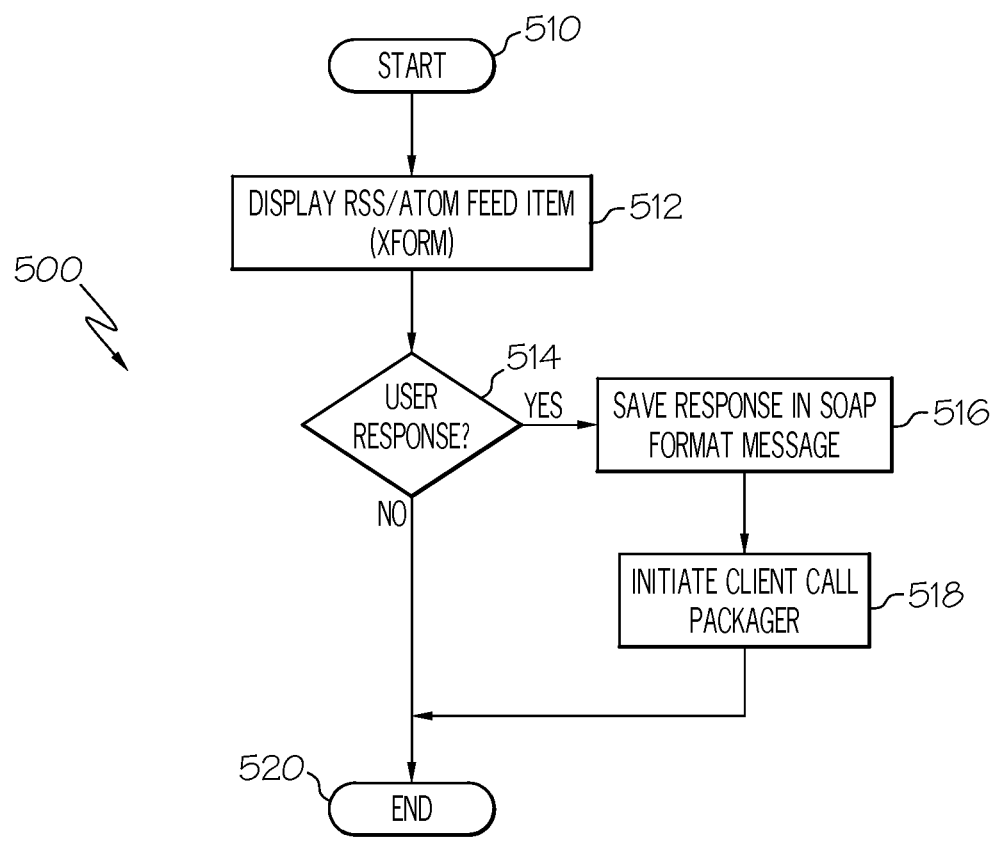
FIG. 5 is a flowchart of a client user interface.

Referring to FIG. 5, client user interface 500 starts whenever opened by a user or in response to the receipt of RSS/ATOM feed item 250 at a client computer (510). In one embodiment, client user interface 500 is specific to a particular web service or XForm, and is contained within a SOAP envelope that makes up RSS/ATOM feed item 250. Client user interface 500 displays the contents of RSS/ATOM feed item 250 which may include XForm data (512). RSS/ATOM feed item 250 may contain, for example, an XForm with a prompt for a user to select an option using a radio button or to enter text information. If the user responds to the contents of the XForm in RSS/ATOM feed 250 (514), the response is saved in a SOAP message (516) and client user interface 500 initiates client call packager 600 (518). If the user does not respond to the contents of RSS/ATOM feed item 250, or after initiating client call packager 500, client user interface stops (520).

Figure 6:
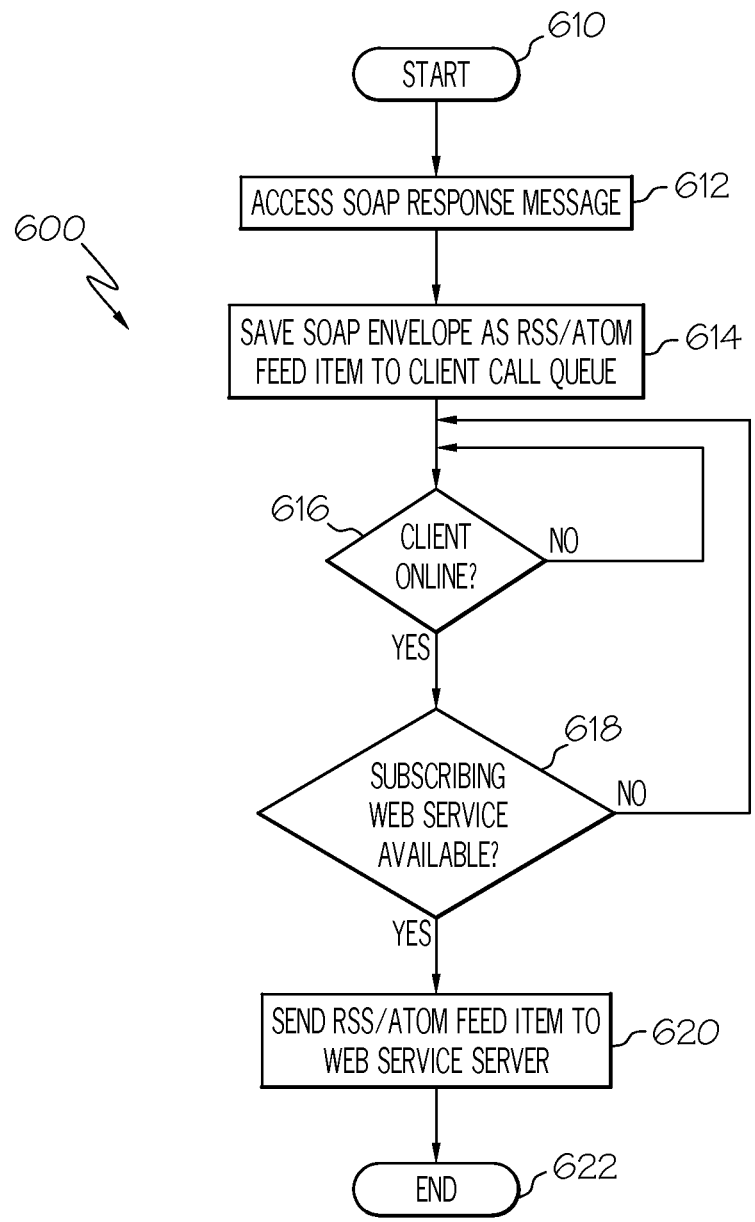
FIG. 6 is a flowchart of a client call packager.

Referring to FIG. 6, client call packager 600 starts when initiated by client user interface 500 (610). Client call packager 600 accesses the XForm result, previously saved as a SOAP message (612), and saves the SOAP message and associated XForm as RSS/ATOM feed item 255 to client call queue 240 (614). Client call packager 600 determines whether the client computer is online (616) and if so, whether web service component 400 corresponding with web service 280 is available (618). Once both the client computer is online and corresponding web service component 500 is available, client call packager 600 sends return RSS/ATOM feed item 255 to RSS/ATOM server 260 (620) then stops (622).

The method of syndicating return RSS/ATOM feed items in steps 616-620 can use the message queuing techniques of typical RSS servers. Whenever the client computer is online, each return RSS/ATOM feed item is sent instantaneously, resulting in a synchronous operation. Whenever the client computer is offline, return RSS/ATOM feed items are stored in a queue, even as the user responds to other previously downloaded RSS/ATOM feeds. Whenever the client computer reconnects to the Internet or corporate network, the return RSS/ATOM feed items are retrieved by the subscribing web services, resulting in the completion of one or more asynchronous operations.

Figure 7:
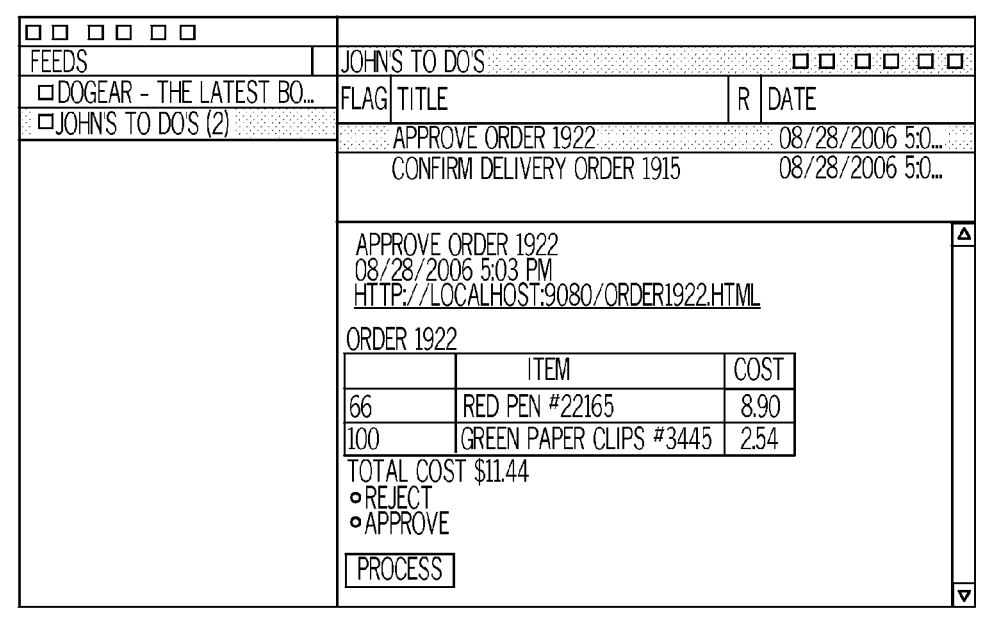

One example applying the SWSC is a web service sending order confirmation requests to sales representatives via an RSS/ATOM feed. Each sales representative subscribes to the RSS/ATOM feed. Whenever a customer makes an order, an order confirmation request is created specifying the sale representative's name in the metadata. When connected to the Internet, the named sales representative will receive the order confirmation request on his laptop as part of the RSS/ATOM subscription. An exemplary order confirmation XForm in an RSS/ATOM user interface is shown by FIG. 7. The sales representative can acknowledge the confirmation, which is packaged as a return RSS/ATOM feed. The web service subscribes to the return RSS/ATOM feed. Whenever the sale representative's laptop is connected to the Internet, the return RSS/ATOM feed is sent to the web service, which receives the acknowledgement and can process the order.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A computer readable memory containing a plurality of instructions to cause a computer to syndicate interactions between a client and a web service, the plurality of instructions comprising:
- a first instruction to send package an XForm containing interactive fields used by a web service in an RSS/ATOM feed item;
- a second instruction to send the RSS/ATOM feed item to a computerized client, wherein the computerized client is a subscriber to the web service's RSS/ATOM feed and the computerized client is in network communication with a server hosting the web service;
- a third instruction to display the XForm on the computerized client;
- responsive to a user of the computerized client manipulating interactive fields in the XForm, a fourth instruction to package the manipulated XForm in a return RSS/ATOM feed item; and
- a fifth instruction to send the return RSS/ATOM feed item to the server hosting the web service, wherein the server is a subscriber to the computerized client's return RSS/ATOM feed.

2. The computer readable memory of claim 1 wherein the XForm is manipulated by the user of the computerized client after the computerized client is no longer in network communication with the server hosting the web service.

3. The computer readable memory of claim 2 wherein the fifth instruction uses a message queue to store the return RSS/ATOM feed item until such time that the computerized client is in network communication with the server hosting the web service.

4. The computer readable memory of claim 1 wherein the XForm is manipulated by the user of the computerized client while the computerized client is in network communication with the server hosting the web service.

5. The computer readable memory of claim 4 wherein the fifth instruction sends the return RSS/ATOM feed item to the server hosting the web service immediately.

6. The computer readable memory of claim 1 wherein the XForm is packaged in the RSS/ATOM feed item as a SOAP message.

* * * * *